United States Patent
Diening et al.

(10) Patent No.: US 6,650,663 B1
(45) Date of Patent: Nov. 18, 2003

(54) POWER-SCALING OF ERBIUM 3/μ M-LASER

(75) Inventors: Andreas Diening, Luebeck (DE); Thomas Sandrock, Waldstadt (DE)

(73) Assignee: CeramOptec Industries, Inc., East Longmeadow, MA (US)

( * ) Notice: Subject to any disclaimer, the term of this patent is extended or adjusted under 35 U.S.C. 154(b) by 0 days.

(21) Appl. No.: 09/574,824

(22) Filed: May 19, 2000

(51) Int. Cl.$^7$ ............................................. H01S 3/067
(52) U.S. Cl. .......................................................... 372/6
(58) Field of Search ................................ 372/6, 39–41; 385/123, 127

(56) References Cited

U.S. PATENT DOCUMENTS 4,815,079 A * 3/1989 Snitzer et al. ................. 372/6
5,982,962 A * 11/1999 Koops et al. ................. 385/37

OTHER PUBLICATIONS

Da_Wun Chen et al., Diode pumped 1–W continuous wave Er:YAG 3μm laser, Optics Letters 24, 385 (1999).
Stuart D. Jackson et al., Diode pumped 1.7 W erbium 3μm fiber laser, Optics Letters 24, 1133 (1999).
T. Sandrock et al., Laser emission of erbium doped fluoride bulk glasses in the spectral range from 2.7 to 2.8 μm, Optics Letters 24, 382 (1999).
T. Sandrock et al., Diode pumped 1–W Er–doped fluoride glass M–profile fiber laser emitting at 2.8 μm, Optics Letters 24, 1284 (1999).

* cited by examiner

Primary Examiner—Paul Ip
Assistant Examiner—James Menefee
(74) Attorney, Agent, or Firm—BJ Associates; Bolesh J. Skutnik; Thomas J. Ryan

(57) ABSTRACT

A diode pumped fiber laser is described that utilizes highly erbium-doped fluoride glass to produce 1 W and higher outputs at about 3 μm. High dopant concentrations in fluoride glass make it possible to efficiently pump the laser around 975 nm which in turn leads to higher slope efficiencies for the laser. Furthermore, by using this pumping wavelength, saturation of laser output due to bleaching of the ground state is overcome. The fluoride glass composition is a modified version of the standard ZBLAN composition. This altered composition achieves high glass quality, enables fiber drawing, and avoids the problem of crystallization.

7 Claims, 3 Drawing Sheets

US 6,650,663 B1

POWER-SCALING OF ERBIUM 3/μ M-LASER

BACKGROUND OF THE INVENTION

1. Field of the Invention

The present invention relates to power scaling of erbium lasers, which are based on glass hosts and are primarily pumped at about 975 nm, and particularly with lasers having high dopant concentrations in a low phonon glass.

2. Invention Disclosure Statement

Erbium-lasers in the middle infrared spectral region are useful for medical and measurement applications, because they operate around 2.7 μm. Prior art diode pumped erbium-lasers, however are limited to output power around 1 W for an erbium-doped crystal laser such as Er:YAG or Er:YSGG (D.-W. Chen, C. L. Fincher, T. S. Rose, F. L. Vernon and R. A. Fields, *Optics Letters* 24, 385 (1999)). For many desired applications, higher output powers are needed. This further scaling, needed especially for various medical/surgical applications, has been hindered by thermal lensing, degradation in output beam quality and frequent rod fracture problems (S. D. Jackson, T. A. King and M. Pollnau, *Optics Letters* 24, 1133 (1999)], which are common for doped crystal lasers.

Recently researchers have been able to generate 1.7 W from a fiber laser based on erbium co-doped with praseodymium. The dopant concentrations were restricted to rather low values in a ZBLAN fluoride glass matrix. Modest efficiencies were reported; 17.3% slope efficiency at 2.71 μm for the diode pumped $Er^{3+}$—$Pr^{3+}$ ZBLAN laser. (Jackson et al.). The need to use a sensitizer-activator pair complicates the system, the economics and the commercialization of the product. The best result was obtained with pumping power of 22.4 W with 790 nm light and about a 45% coupling efficiency for the light incident on the fiber laser's end surface.

Other crystal based lasers have been tried somewhat successfully in power output, 1 W output and efficiencies of 20–25%. In one prior art method, populating the upper laser-level directly at 970 nm has been used to pump $Er^{3+}$-doped crystals, with doping concentrations of 10–15 molar % (T. Jensen, A. Diening, G. Huber and B. H. T. Chai *Optics Letters* 21, 585 (1996)). An up-conversion process depopulates the lower laser level while "recycling" pump energy partially populates the multiplet again. This pumping scheme seems to be efficient, but requires high doping concentrations. The disadvantages of a crystal substrate are still present. A remaining problem is however, that typically concentrations above 1 molar % have not been achieved in ZBLAN host materials.

Some fluoride glasses were made in bulk with higher molar % of Er and were tested by the inventors (T. Sandrock, A. Diening and G. Huber, *Optics Letters* 24, 382 (1999)). Using laser diodes with 972 nm output and a fluoride glass with 8 molar % of Er, they found lasing output in the 2.7–2.8 μm region. The efficiency was low, 10%, but the threshold power was very promising. A major remaining problem is a desire to gain the efficiency benefits of a fiber laser configuration, but realizing that drawing a fluoride glass with high dopant concentrations can lead to destabilization of the glass with crystallite formation during the draw process.

The present invention solves the main problems in the prior art by extending this work in bulk glasses to provide scalable erbium fiber lasers operating in the 2.8 μm region.

BRIEF SUMMARY OF THE INVENTION

It is an object of the present invention to provide a erbium ion fiber laser whose output is scalable above 1 w, without requiring co-dopants.

It is another object of the present invention to provide erbium fiber lasers operating in the vicinity of 3 μm and having output greater than 1 w.

It is yet another object of the present invention to provide an erbium laser which is efficiently pumped by sources operating at around 975 nm because of higher slope efficiencies and reduced bleaching of the ground state at this pumping wavelength.

Briefly stated the present invention provides a diode pumped fiber laser that utilizes highly erbium-doped fluoride glass to produce 1 W and higher outputs at about 3 μm. High dopant concentrations in fluoride glass make it possible to efficiently pump the laser around 975 nm which in turn leads to higher slope efficiencies for the laser. Furthermore, by using this pumping wavelength, saturation of laser output due to bleaching of the ground state is overcome. The fluoride glass composition is a modified version of the standard ZBLAN composition. This altered composition achieves high glass quality, enables fiber drawing, and avoids the problem of crystallization.

The above, and other objects, features and advantages of the present invention will become apparent from the following description read in conjunction with the accompanying drawings.

BRIEF DESCRIPTION OF FIGURES

FIG. 3b—depicts the refractive index profile of the preferred embodiment of FIG. 3a.

DETAILED DESCRIPTION OF PREFERRED EMBODIMENTS

The prior art limitations have been overcome working with excitation wavelengths in the 970 to 980 nm range instead of the 800 nm range and by being able to draw laser fiber using a highly erbium-doped fluoride glass capable of remaining crystallite-free.

Figure 1:
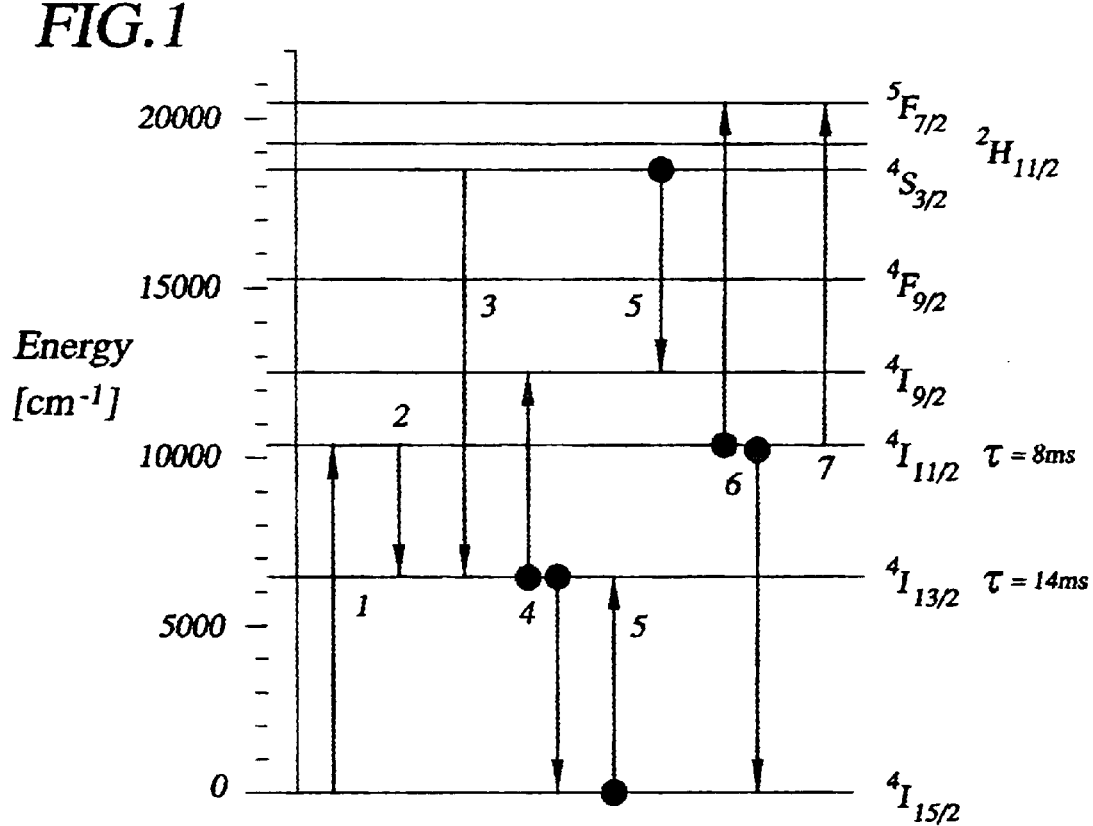
FIG. 1—an energy-level diagram and excitation scheme of $Er^{3+}$-doped Fluoride Glass (FG).

The benefits of using a '970' nm pump energy are more easily understood in light of the energy-level diagram in FIG. 1. This figure depicts the energy level and excitation scheme for $Er^{3+}$ ions. Arrow 1 represents ground state absorption ($\lambda_p \sim 970$ nm) between ground state $^4I_{15/2}$ and excited state $^4I_{11/2}$, which populates the upper laser level of Er ion directly and has come to prominence mainly as a means of exciting Er-doped crystals. An up-conversion process ($^4I_{13/2}$, $^4I_{12/2} \rightarrow {}^4I_{15/12}$, $^4I_{11/2}$; process 4, FIG. 1) depopulates the lower laser level while recycling pump energy partially and thus populating the $^4I_{11,2}$ multiplet by relaxation again. This pumping scheme seems to be the most efficient but requires high doping concentrations. Furthermore, a cross-relaxation process $^4S_{3/2}$, $^4I_{15/2} \rightarrow {}^4I_{9/2}$, $^4I_{13/2}$; arrow 5, FIG. 1) becomes possible at high doping levels. These processes increase the inversion and suppress the laser emission at 850 nm (arrow 3, FIG. 1) that was observed in earlier experiments. On the other hand, the upper laser level $^4I_{11/2}$ is depopulated more efficiently at high doping concentrations by a second up-conversion process ($^4I_{11/12}$, $^4I_{11/2} \rightarrow {}^4I_{15/2}$, $^4S_{3/2}$; process 6, FIG. 1) and excited-state absorption at the pump wavelength ($^4I_{11/2} \rightarrow {}^4S_{3/2}$; arrow 7, FIG. 1). The $Er^{3+}$ concentrations that are necessary to exploit such mechanisms are of the order of 5 mol. % and are difficult to obtain in ZBIAN host materials.

Using the standard ZBLAN composition, crystallization often occurs, when high dopant concentrations of erbium are used. In the preferred embodiment of the present invention, highly erbium-doped fluoride glasses are used as the active material for erbium 3 μm-lasers. In comparison to crystalline host materials, glass materials offer the advantage of fiber drawing. This advantage leads to improved heat removal and increased laser gain. Low phonon energy and transparency at the laser wavelength are the reasons why fluoride glass must be used. For example, for an erbium 3 μm-laser, a low phonon material is needed to achieve efficient laser oscillation and the material has to be transparent to the laser wavelength or self-absorption will greatly minimize the effective output of the laser, especially if a 'long cavity', as is generally the case for glass fiber lasers, is used.

For efficient laser oscillation, a certain high doping level is generally required because it leads to an optimization of inter-ionic energy transfer processes. In the present invention, fluoride glass, based on the elements in a ZBLAN composition, is used. This glass can be drawn into fiber without a serious the problem of crystallization.

The present invention is further illustrated by the following examples, but is not limited thereby.

Laser experiments were performed on fluoride glass (FG) bulk samples containing 1 mol %, 5 mol %, and 8 mol % of $ErF_3$, to identify optimum doping concentrations for the fibers. A 3-W fiber coupled laser diode (Diameter $\phi_{core}$=100 μm, NA=0.2) at $\lambda_p$~973 nm was focused into a hemispherical resonator. The 2 mm (ER(1%):FG) and 7 mm (Er(8%):FG) long glass samples were positioned close to the plane mirror. The results are show in FIG. 2 and Table 1. The slope efficiency of the laser is indicated by η[%]. A maximum output power of 164 mW was achieved at 8 mol % doping level and 0.5% output coupling. A decrease of efficiency and output power was observed at lower doping levels. The bulk glasses suffered from thermal loading at pump powers exceeding 2 W and some saturation effects.

TABLE 1

Overview of the laser parameters.

| Laser Medium | Er(1 mol %): FG bulk | Er(5 mol %): FG bulk | Er(8 mol %): FG bulk | Er(5 mol %): FG M-profile fiber 11 cm |
|---|---|---|---|---|
| length [cm] | 0.2 | 0.7 | 0.7 | 11 |
| Output coupling [%] | 0.5 | 0.5 | 0.5 | 1 |
| $P_{thr}$ [W] | no laser emission | 0.11 | 0.04 | 0.08 |
| η [%] | | 5 | 10 | 3 |
| $P_{in,max}$ [W] | | 1.81 | 1.81 | 2.18 |
| $P_{out,max}$ [W] | | 0.074 | 0.164 | 0.066 |

Experiments were then performed using a M-profile FG fiber. FIG. 3b depicts the refractive index profile of an M profile fiber. In FIG. 3a polyacrylate coating 1 and cladding 2 cover pump core 3 and $Er^{3+}$-doped ring 4. Cladding 2 is a low refractive index resin. The diameter of pump core 3 (NA>0.35) is 200 μm and includes $Er^{3+}$(5mol %)—doped ring 4 (NA=0.15) with an inner diameter of 130 μm and a thickness of 13 μm. The fiber was 11 cm long. In this preliminary experiment, the 3-W laser diode was again used as the pump source. The resonator consists of two plane butt-coupled mirrors with transmissions at the laser wavelength of 0.2% at the front face and 1% at the rear face. These results are also shown in FIG. 2 and Table 1, Note neither fiber length nor output coupling were optimized.

Figure 2:
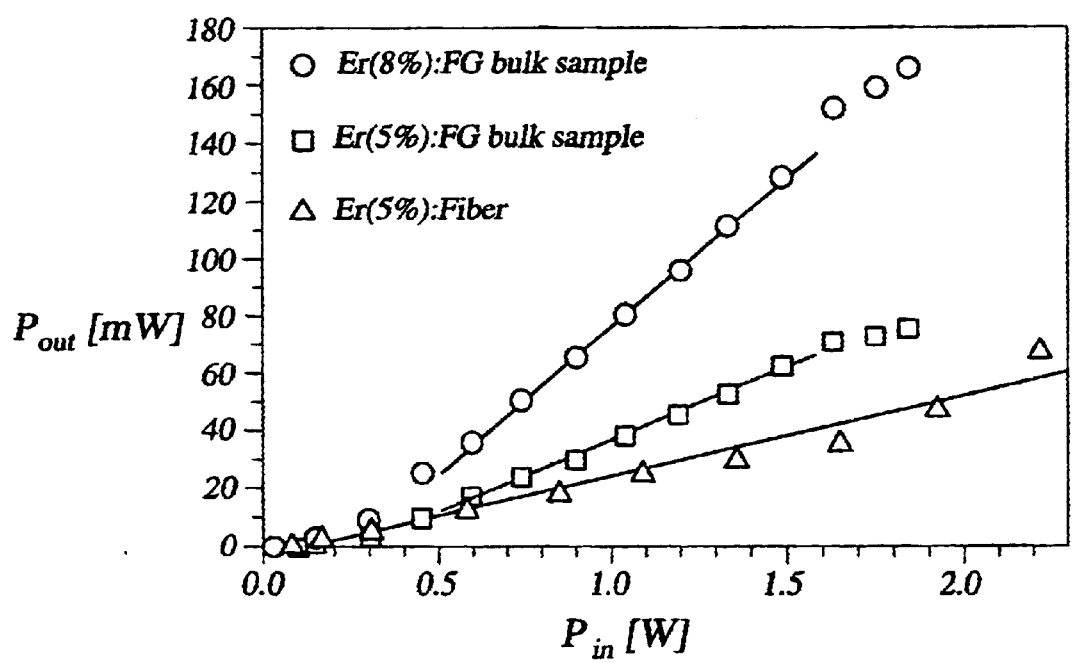
FIG. 2—depicts the input-output characteristics of different $Er^{3+}$-doped FG bulk samples and a preferred embodiment fiber laser.
Figure 3A:
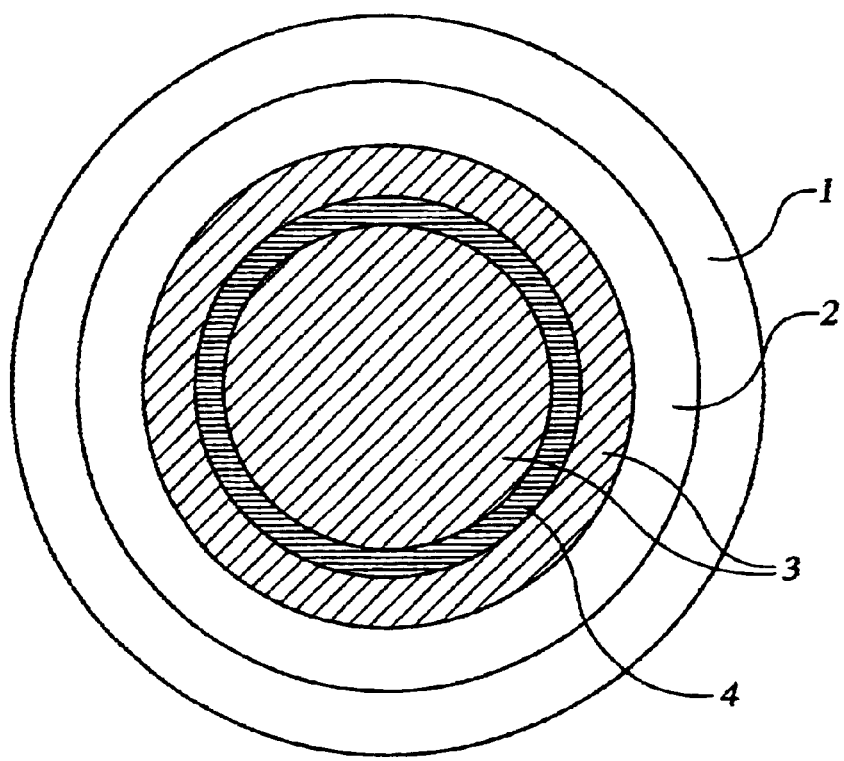
FIG. 3a—depicts the schematic structure of a preferred embodiment, an M-profile fiber.
Figure 3B:
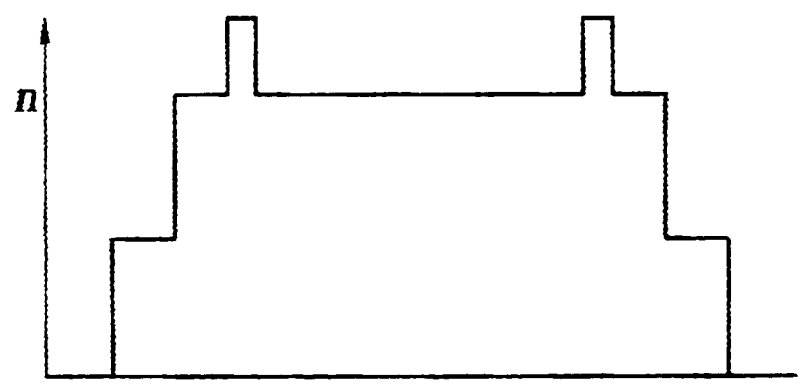
Figure 4:
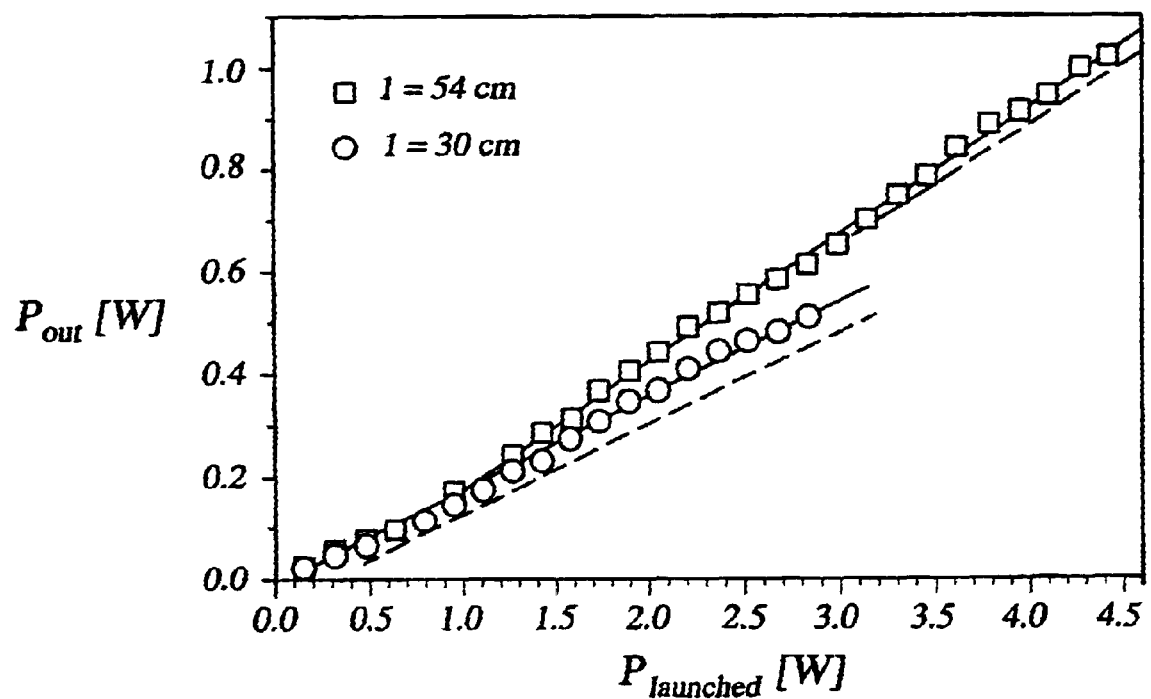
FIG. 4—depicts input-output characteristics of a preferred embodiment fiber laser at two different fiber lengths.

In FIG. 4, the effects of fiber length on lasing performance under more carefully optimized coupling conditions using laser fiber with the same composition and fiber characteristics as in FIGS. 2 and 3 are illustrated. Above the laser threshold, one finds a linear relationship between the output power at $\lambda_L$=2.79 μm and the pump power. With a 54 cm long fiber a maximum output power of 1.04 W was corresponding pump power at laser threshold was 0.12 W. For the shorter fiber the maximum pump power was limited to 2.8 W to avoid potential damage to the fiber. Under these conditions the maximum output power was 0.51 W with a slope efficiency of 20%. These results are summarized in Table 2. In neither case, even at the highest pump powers, no saturation effect or thermally caused deterioration was observed.

TABLE 2

Overview fiber laser parameters.

| Laser Medium | Er(5 mol %): FG M-profile fiber | Er(5 mol %): FG M-profile fiber |
|---|---|---|
| Length [cm] | 30 | 54 |
| $P_{thr}$ [W] | 0.12 | 0.12 |
| η [%] | 20 | 25 |
| $P_{in,max}$ [W] | 2.79 | 4.42 |
| $P_{out,max}$ [W] | 0.51 | 1.04 |

While a specific fiber configuration has been illustrated herein, many other refractive index profiles can also provide erbium fiber lasers within the limits of the present invention. These generally require a pumping area, surrounding or including the doped active (lasing) area, plus an overcladding which provides a large numerical aperture for the pumping area. A protective layer or layers is also usually applied over the active areas. Pumping areas can have round, polygonal, or other cross-sectional areas, as is well known in the art of preparing fiber lasers. The active (lasing) medium (area) can be symmetrically surrounded by the pumping area or purposely off set from center to enhance interaction with the modes of pumping light as is also well known in the art of preparing fiber lasers.

Important to the functioning of the invention is the use of a fluoride glass with a low phonon energy and high transparency at the pumping wavelength and the lasing wavelength. High erbium molar doping levels permit the efficient use of 970–980 nm pumping light with the reported gains in electronic efficiencies. The fluoride glass host must be chosen to not only accept high erbium dopant levels, but must be a stable glass composition so that fibers may be drawn without danger of crystallite formation during fiberization.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. An erbium fiber laser, comprising:
   a fiber having an active area, a first cladding, at least a portion of which surrounds said active area, and a second cladding, wherein a refractive index of said active area is higher than a refractive index of said first cladding, whose refractive index in turn is higher than that of said second cladding;
   reflective elements to create a resonating cavity within a selected length of said fiber; and
   a source of pumping radiation optically coupled to said fiber for delivering said pumping radiation to said active core to stimulate a laser emission from said resonating cavity;
   wherein said active area and at least said first cladding comprising a heavy metal fluoride glass composition;
   wherein said active area has only one active material dopant in its fluoride glass composition;
   said active material dopant is erbium, being present at least at 5 molar %; and
   wherein said laser emission is in the middle infrared spectral region, having a wavelength of around 3 $\mu$m, and said pumping radiation has a wavelength of about 970 nm.

2. An erbium fiber laser according to claim 1 wherein said laser has a slope efficiency substantially equivalent to that of an erbium doped laser crystal.

3. An erbium fiber laser according to claim 1, wherein said fiber has a double clad core structure, in which said active area is a central core; a first cladding surrounds said core; and a second cladding surrounds said first cladding.

4. An erbium fiber laser according to claim 3, wherein said core having active material is not geometrically centered within said first cladding.

5. An erbium fiber laser according to claim 1, wherein said fiber has a single core and said active material forms a ring cross-sectional area within said core.

6. An erbium fiber laser according to claim 1, wherein said means to create a resonating cavity are a pair of mirrors placed at opposing ends of said fiber length and having appropriate transmission and reflection properties to permit pumping with 970 nm light and operating said laser at around 3 $\mu$m.

7. An erbium fiber laser according to claim 1, wherein said means to create a resonating cavity are gratings set within or near said active area, wherein said gratings have appropriate transmission and reflection properties to permit pumping with 970 nm light and operating said laser at around 3 $\mu$m.

* * * * *